UNITED STATES PATENT OFFICE.

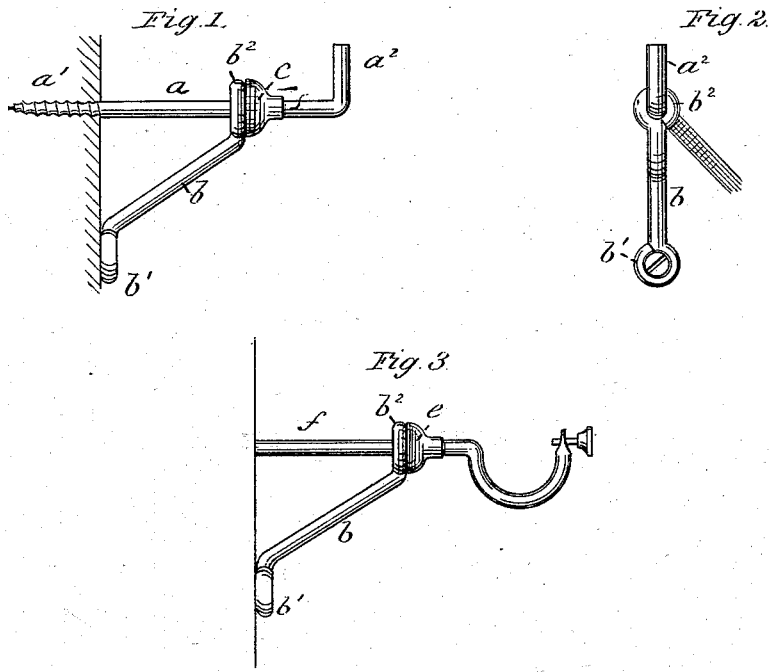

THOMAS C. RICHARDS, OF WINSTED, CONNECTICUT.

CORNICE-HOOK.

SPECIFICATION forming part of Letters Patent No. 283,280, dated August 14, 1883.

Application filed August 28, 1882. (No model.)

*To all whom it may concern:*

Be it known that I, THOMAS C. RICHARDS, of Winsted, in the county of Litchfield and State of Connecticut, have invented certain new and useful Improvements in Cornice-Hooks, of which the following is a description, reference being had to the accompanying drawings, where—

Figure 1 is a side view of a cornice-hook embodying my invention. Fig. 2 is a front view of same. Fig. 3 is a side view of a cornice-pole bracket with my improvement.

My invention relates to articles of upholsterers' hardware formed of standard sizes of wire, and particularly to cornice-hooks, cornice-pole brackets, bird-cage hooks, and the like; and it consists of an improved brace used in combination with the hooks and brackets, whereby a more efficient device for support is formed.

In the accompanying drawings, the letter $a$ denotes a cornice-hook, having at one end a screw, $a'$, at the other an upward-projecting arm, $a^2$, forming the hook, the whole being formed of a piece of bright wire of any standard diameter. This is adapted to screw into the wall of a room to support a cornice or the like, which is secured by the hook $a^2$ taking into a socket fast to the cornice.

In order to support any considerable weight, it was formerly necessary to use wire of large diameter; but to greatly increase the supporting-power of any given wire I make use of the wire brace $b$, formed of wire similar to that in the hook, and having at each end sockets, whereby one end is secured to the wall by nail or screw, and the other, encircling the stem of the hook, abuts against the shoulder $c$, fast to or integral with the hook.

The shoulder $c$ is formed of metal, as lead, cast completely about the stem, which is properly prepared, as by roughening, or by tinning and soldering in the casting, to secure the shoulder against motion under the thrust of the brace. A similar shoulder, $c$, is used on the cornice-pole bracket $f$, Fig. 3, and this shoulder in each instance forms a bearing completely about the wire of the hook for the eye or socket of the brace, thus making the hook firm against vertical vibration and steadying it laterally as well.

I have found by experiment that the best place for the shoulder is about one-third of the distance from the outer end to the face of the wall, as the hook, when braced at that point, bears several times the weight under which it breaks down when the brace bears on either side of this point.

In my device the hook or bracket may be made of comparatively small wire, as it is subject in the greater part to only a tensile strain, and the bracket of a diameter suitable to thrust or compression strain, and the whole made cheaper and more efficient than prior to my invention.

I am aware that suspending-hooks and bearing-rods have been formed of wire bent in various forms; and these I do not broadly claim.

I claim as my invention—

1. In combination, a hook formed of wire having a shoulder cast completely about the stem, and a brace having at one end an eye formed in the wire, encircling the stem of the hook and bearing against the shoulder, and at the other end an eye forming a screw-socket, all substantially as described.

2. In combination, hook $a$, having screw end $a'$, upright arm $a^2$, and shoulder $c$, cast about the stem, and brace $b$, having eyes or sockets $b'$ $b^2$, the hook and brace being formed of merchantable wire, all substantially as described.

THOMAS C. RICHARDS.

Witnesses:
CHAS. L. BURDETT,
WALTER H. BUNCE.